United States Patent [19]

Slocum

[11] Patent Number: 5,094,058

[45] Date of Patent: Mar. 10, 1992

[54] ROOFING SHINGLE

[76] Inventor: Donald H. Slocum, 61 Chimnay Ridge Rd., Convent Station, N.J. 07961

[21] Appl. No.: 391,652

[22] Filed: Aug. 8, 1989

Related U.S. Application Data

[60] Continuation-in-part of Ser. No. 177,487, Apr. 1, 1988, abandoned, which is a division of Ser. No. 80,967, Aug. 3, 1987, abandoned.

[51] Int. Cl.$^5$ ............................................... E04D 1/00
[52] U.S. Cl. ....................................... 52/533; 52/554; 52/560; 52/536; 264/171
[58] Field of Search ............... 264/148, 171, 131, 132, 264/133, 102; 423/812; 52/537, 533, 520, 534, 536, 518, DIG. 9, 553, 554, 560

[56] References Cited

U.S. PATENT DOCUMENTS

| | | | |
|---|---|---|---|
| 2,023,990 | 12/1935 | Buczkowski | 264/131 |
| 4,237,082 | 12/1980 | LaSpisa | 264/148 |
| 4,290,248 | 9/1981 | Kemerer | 264/171 |
| 4,294,638 | 10/1981 | Rasmussen | 264/173 |
| 4,323,533 | 4/1982 | Bramhall | 264/148 |
| 4,436,685 | 3/1984 | Emura | 264/148 |
| 4,440,709 | 4/1984 | Rasmussen | 264/167 |
| 4,459,093 | 7/1984 | Asano | 264/148 |
| 4,489,025 | 12/1984 | Fenn, III | 264/131 |
| 4,636,345 | 1/1987 | Jensen | 264/122 |
| 4,655,981 | 4/1987 | Nielsen | 264/148 |
| 4,663,103 | 5/1987 | McCullough | 264/102 |
| 4,695,165 | 9/1987 | Fukumizu | 264/211.21 |

Primary Examiner—David A. Scherbel
Assistant Examiner—Lan Mai
Attorney, Agent, or Firm—McGlew & Tuttle

[57] ABSTRACT

The improved roofing shingle has a body portion of generally flat, four-sided polygonal configuration and relatively thin in thickness. The body portion is provided with a plurality of irregular corrugations or otherwise deformed to give the roofing shingle the appearance of natural wood or other natural material such as slate. The body portion has a channel formed in the under surface so that the upper surface forms a ridge extending substantially parallel to the upper edge of the body portion. The body portion is also provided adjacent each of the opposite side or vertical edges with raised portions which are so shaped and dimensioned as to have one raised portion nest within the raised portion of a next adjacent like roofing shingle. The ridge and nested raised portions forming barriers to water infiltration between the overlapping shingles.

3 Claims, 2 Drawing Sheets

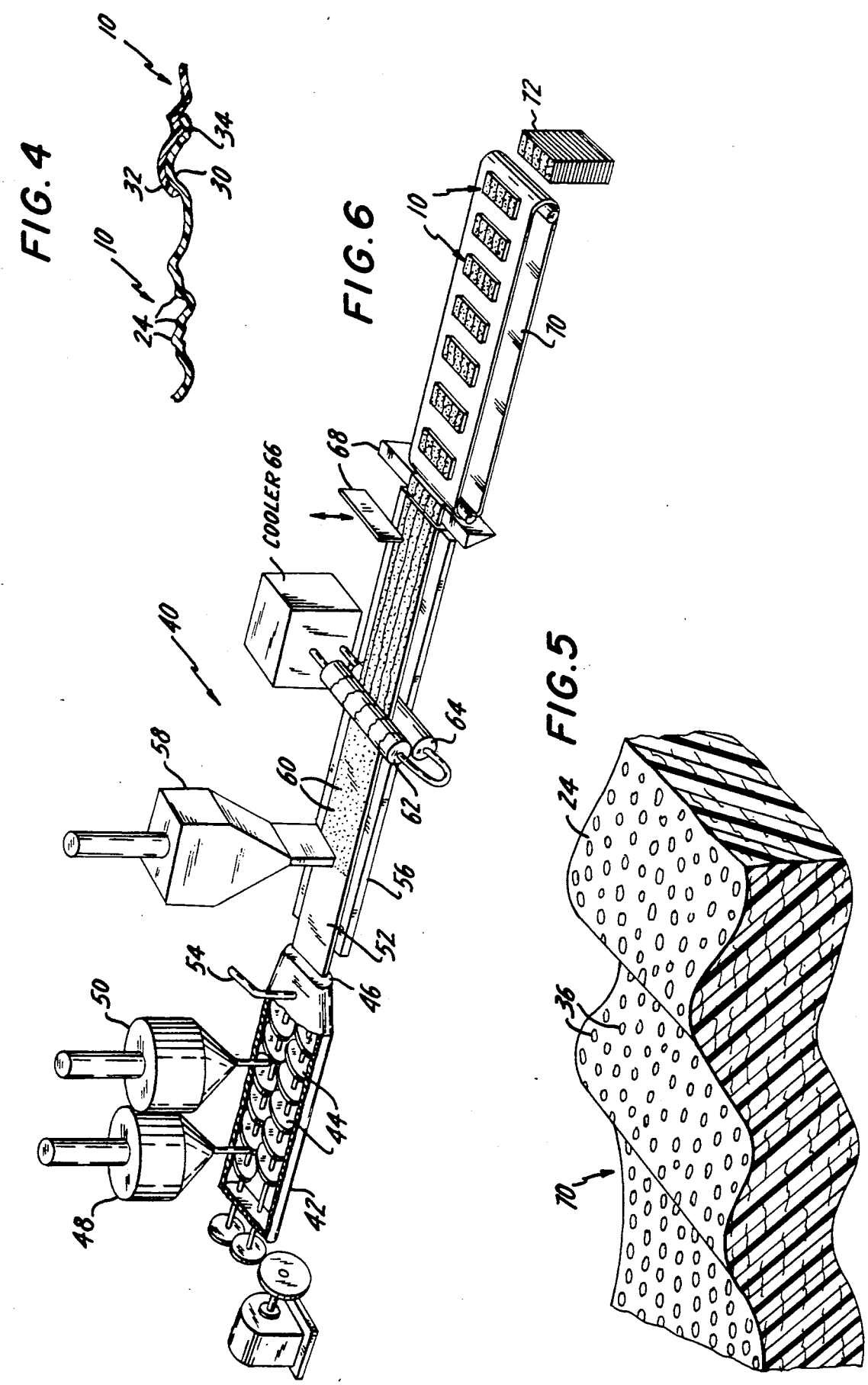

ROOFING SHINGLE

This invention relates to roofing shingles, and more particularly to an improved roofing shingle of the plastic type, and is continuation-in-part application of application Ser. No. 177,487 filed Apr. 1, 1988, now abandoned which is a division of application, Ser. No. 080,967, filed Aug. 3, 1987, now abandoned.

BACKGROUND OF THE INVENTION

Heretofore, a great variety of roofing shingles have been developed for residential and commercial buildings. There are roofing shingles made from asphaltic laminations, asphaltic impregnated fiber glass or organic felt plastic materials, metal and wood composite material covered by a thin shell of hard plastic material backed by foam plastic. All of these various roofing shingles applied to roofs of slopes exceeding a 3 foot rise in 12 feet require considerable overlap of adjacent shingles to insure a water tight seal and, therefore, require the use of a relatively great number of shingles for a given surface of roof. Also the presently known roofing shingles have limited weatherability or operative life. In addition, some roofs requiring reshingling must first have the existing shingling removed to avoid the irregularities of the old shingling from being discernable in the newly shingled roof. These and other disadvantages of presently known roof shingles are eliminated by the improved roof shingle of this invention.

The method of producing the improved roof shingle according to this invention is of the continuous type, as distinguished from the conventional batch processes and labor intensiveness of presently known fabrication techniques.

It is therefore an object of this invention to provide an improved roofing shingle having a high degree of weatherability and yet relatively inexpensive to produce.

Another object of the present invention is to provide an improved roofing shingle in which overlapping of the vertical edges of the shingles is greatly reduced, while at the same time the need for flashing under the area of vertical abutment of next adjacent roof shingles is eliminated.

A further object of this invention is to provide an improved roofing shingle capable of being provided with a surface contour such as striations or corrugations to give it the appearance of hand-split shake or slate.

Yet another object of the invention is to provide a method of fabrication of an improved roofing shingle and the roofing shingle attained thereby which results in little or no emissions and uses no solvents as compared to asphaltic methods.

SUMMARY OF THE INVENTION

Now, therefore, the present invention provides an improved roof shingle comprising a body portion of substantially planar, rectangular configuration, relatively thin in thickness and having a top and bottom surface and upper, lower and opposite side edges. The roofing shingle is contoured adjacent each of the opposite side edges to form a channel in the bottom surface and a juxtaposed raised portion extending above the adjacent top surface. Each of the channels are shaped and dimensioned to extend a substantial distance from the lower edge toward the top edge of the shingle and to nest with the channel of the next adjacent like-roofing shingle. Thus the roofing shingles according to this invention provide a side lap, interlocking joint between next and adjacent roofing shingles which serves as a dam to prevent water penetration or infiltration, at the joint, to the roof. Also because of the contour and shiplap type of joint, such overlap is relatively small and a lesser number of singles need be used than heretofore to cover the same area of roof.

In a narrower aspect of the roof shingle of this invention the shingle has a plurality of irregularly formed and randomly arranged corrugations or striations so that the roof shingle has the appearance of natural wood, e.g. cedar shakes,or slate. This simulation of natural wood or slate can be further enhanced by the proper alignment of roofing shingles of this invention into which variagated colored granules or beads of wear resistant and fireproof material are impregnated into the top surface of the roofing shingles.

The roofing shingle is also preferably composed of a homogeneous mixture of plastic resin, preferably polypropylene, and a fibrous filler, such as raw ground cotton husks, preferably of about 30–100 screen size.

The method of fabrication of this invention comprises the steps of mixing a fibrous filler and a plastic into a hot, malleable homogeneous mixture. Then forming by extrusion that mixture into a flat sheet while still hot and soft. Thereafter, applying to one surface thereof wear resistant and fireproof simultaneously with deforming the sheet rapid coolant. This is followed by deforming the flat sheet to impart a contour to the surface thereof. The contoured sheet is thereafter cut into smaller pieces to provide roofing shingles of a desired size.

A feature of this method is the use of an extruder having at least two counter-rotating feed screws into which the dry plastic and fibrous filler are mixed under pressure to a provide a hot, malleable homogeneous mixture which is discharged through the extruder die into a flat sheet.

BRIEF DESCRIPTION OF THE DRAWINGS

The above and other objectives and advantages of the present invention will appear more fully hereinafter from a consideration of the detailed description which follows when taken together with the accompanying drawings wherein the invention is illustrated and, in which:

FIG. 4 is a view in cross section taken along line 4—4 of FIG. 2, somewhat enlarged;

FIG. 5 is a fragmentary perspective view, in cross section, of the roof shingle on a greatly enlarged scale; and FIG. 6 is a schematic perspective view of the apparatus for carrying out the method of fabricating the roofing shingle according to this invention.

DESCRIPTION OF THE PREFERRED EMBODIMENT

Figure 1:
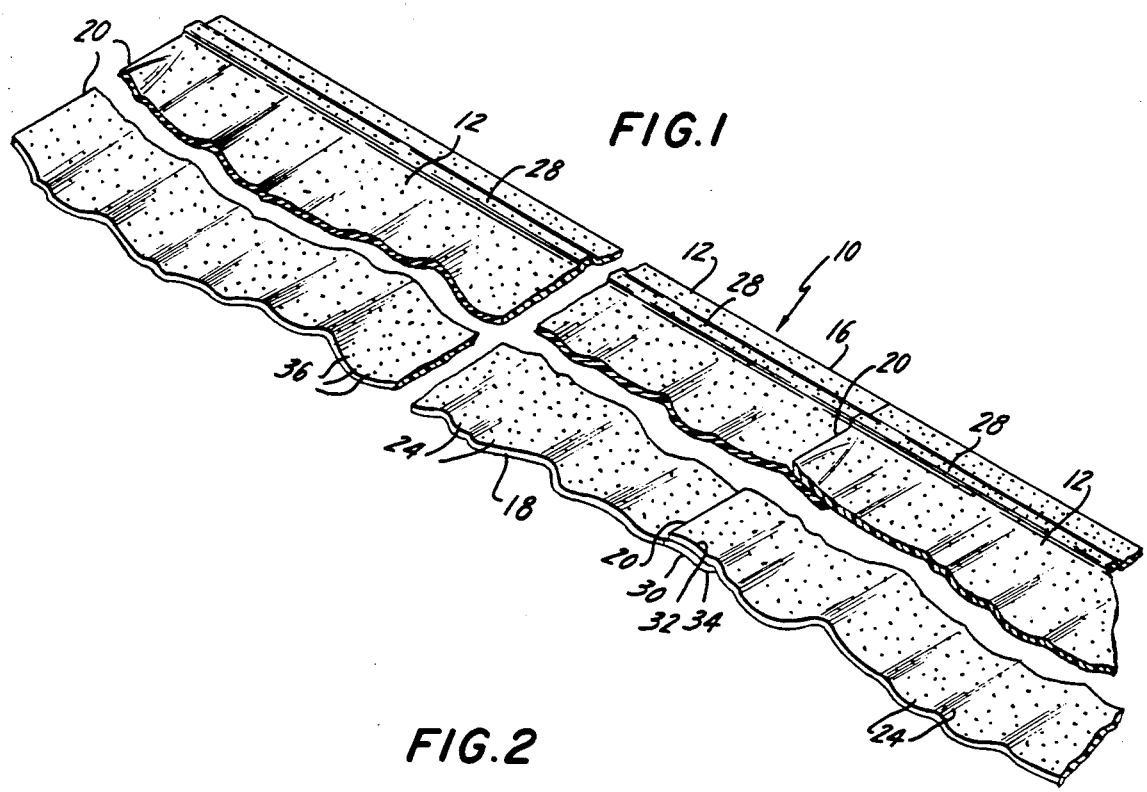
FIG. 1 is a perspective view of a roofing shingle according to this invention shown in overlapping relationship to a next adjacent roofing shingle, partly broken away for illustration purposes only.
Figure 2:
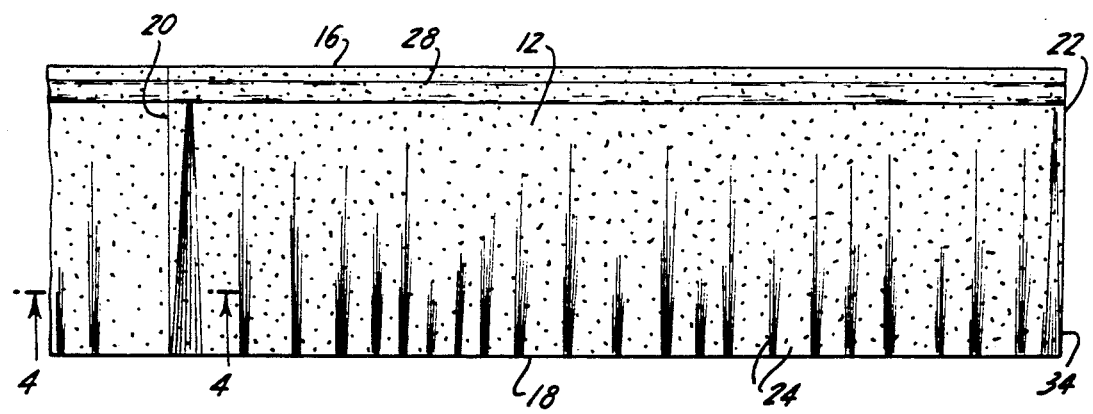
FIG. 2 is a top plan view of the roofing shingles shown in FIG. 1, on a somewhat smaller scale.

Now referring to the drawings and more particularly to FIGS. 1 and 5, the reference number 10 generally designates the roofing shingle according to this invention.

Roofing Shingle Configuration

Figure 3:
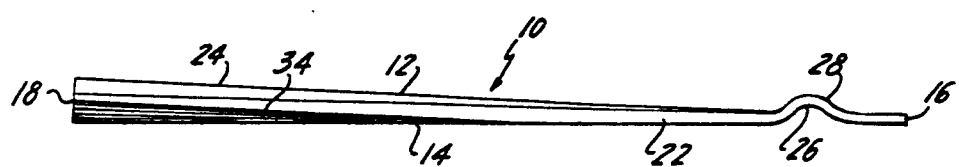
FIG. 3 is an end elevational view of the roofing shingle of this invention, shown on an enlarged scale.

The roofing shingle 10 has a body portion generally of flat or planar, polygonal configuration and relatively thin in thickness. Preferably, the roofing shingle 10 is of rectangular configuration as is shown in the drawings with top and bottom surfaces 12 and 14, respectively, upper and lower longitudinal edges 16 and 18, respectively, and opposite side or lateral edges 20 and 22. The roofing shingle 10 has a multiplicity of irregular striations or corrugations 24 extending from the lower edge 18 toward the upper edge 16. The corrugations 24 are of varying depths and heights and are randomly arranged to simulate or provide the appearance of natural wood, e.g. cedar shake. The roofing shingle 10 can be provided with other contours or given a texture to simulate other natural material, as for example, without departure from the scope and spirit of this invention. The roofing shingle 10 is provided with a channel 26 in the bottom surface 14 extending in spaced, substantially parallel relationship with the upper edge 16. This channel 26 forms on the upper surface 12 a longitudinally extending ridge 28 which serves as a barrier or dam to prevent water penetration or infiltration between overlapping roof shingles 10 to the upper edge 16, and thence, to the roof surface (not shown) which is to be protected against the weather. The corrugations 24 are of greatest depth and height at the lower longitudinal edge 18 and diminish in depth and height as they extend toward upper edge 16. Preferably the longest of the corrugations 24 terminate substantially at the ridge 28 so that before and beyond ridge 28 the roofing shingle is flat (see FIG. 3). Adjacent lateral edges 20 and 22 the roofing shingle has deformations or corrugations 30 and 32, respectively. These corrugations 30 and 32 are shaped and dimensioned so that corrugation 30 nests within the corrugation 32 of the next adjacent roofing shingle 10. The nested corrugations 30 and 32 form a barrier or dam to prevent water penetration or infiltration, through the ship-lap joint, to the roof surface to be protected (not shown). As best shown in FIGS. 1 and 4, corrugations 30 and 32 are preferably so formed as to include a lip portion 34 at lateral edge 22 which is upturned away from the roof surface (not shown) to be covered, the overlying roofing shingle being provided with a contour to nest with lip portion 34. The top surface 12 of the roof shingle is preferably impregnated with wear resistant and fire-proof granules or beads 36, as for example, ceramic or stone particles distributed in a pattern that allows for complete coverage and to create a desired design and appearance. For example, different colored granules 36 may be distributed in accordance with corrugations 24, 30 and 32 or other contours to enhance, in roofing shingle 10, the appearance of natural wood, slate or other natural material. By the proper alignment of variegated colors to coincide with the hills and valleys of the corrugations, the effect of linearity is heightened and emphasized.

Composition of the Roofing Shingle

The body portion of roofing shingle 10 is, as best shown in FIG. 5, composed of a homogeneous mixture of a plastic, preferably polypropylene, and a fibrous filler, such as ground raw cotton husks. Where ground raw cotton husks are used as a filler, the cotton husks are preferably ground to between 30 and about 100 screen size.

Application of the Roofing Shingle

The ship-lap system of installation of roofing shingles 10, along with the feature of ridges 28, nested corrugations 30, 32, and 34 which effectively block water penetration between overlapping shingles at the longitudinal upper edge 16 and lateral edge joints, eliminates the need for flashing at the lateral edge joints or the need for multiple coverage or layers or extensive overlap of adjacent shingles. Thus, to cover a given area of roof surface, fewer roofing shingles 10 need be used than would be required if conventional roofing shingles were employed to cover the same roof area. Also, by the use of roofing shingles 10, the weight load on the roof is less than with the use of conventional roofing shingles.

Method of Fabrication of the Roofing Shingle

FIG. 6 discloses schematically the type of apparatus 40 which is used to fabricate roofing shingles 10 by a continuous method. The apparatus comprises an extruder 42 which preferably contains at least two counter-rotating screws 44 and a die end portion 46. Two hoppers 48 and 50 contain dry plastic polymer particles and ground fibrous filler, respectively, which material are discharged in the desired proportions into extruder 42. In extruder 42 the plastic particles and filler are mixed and blended under pressure into a homogeneous mixture while being conveyed toward die discharge end portion 46. This mixing and compression of the mixture generates heat which softens the plastic so that the homogeneous mixture is discharged from the die into a hot, flat sheet 52 of substantially uniform thickness. The gases and vapors are vented to the atmosphere through suitable means such as pipe 54. The extruded sheet 52 is supported on a conveyor or table 56 and passes under the one or more hoppers 58 containing particles or beads of wear resistant fireproof material, such as ceramic or stone, in one or more colors. The wear resistant and fireproof particles 36 are distributed as desired onto the upper surface of the sheet which surface is to become the top surface 12 of roofing shingle 10. After the application of particles 36, the sheet 52 passes between two interfitting contour rollers 62 and 64. The contoured rollers 62 and 64 have surfaces which are shaped or textured and positioned relative to each other so that the surface shapes intermesh or interfit to produce the corrugations 24, 28, 30 and 32 in roofing shingle 10. The rollers 62 and 64 function to squeeze the particles 36 into the surface of the sheet which simultaneously imparting corrugations or striations 24, 28, 30 and 32 to the sheet. The rollers 62 and 64 are cooled by circulation of a refrigerant therethrough, from a cooler 66, so that the hot sheet is cooled and the contour, which is imparted to the sheet, is fixed or made permanent. After contouring and texturing, the sheet is cut by a cutting mechanism 68 which functions intermittently relative to the speed of travel of sheet 52 to cut the sheet into the desired size roofing shingle 10. The cut roofing shingles 10 are then conveyed by a conveyor 70 to a place of collection in stacks 72.

It is believed now readily apparent that an improved roofing shingle has been provided. The roofing shingle has a configuration which incorporates water dams or barriers which prevent the penetration of water between the overlapping shingles to the roof structure and eliminates the need for flashing and/or extensive overlapping of the next adjacent roofing shingles. This feature reduces the amount of roofing shingles required for a particular application and results in lighter, less expensive roof covers.

It is not the intention hereof to restrict the invention by the figures and description hereof, but it should be understood that the present disclosure is to illustrate the concepts and principles of the present invention and that changes or alterations thereto obvious to one skilled in the art would still come within the scope of this disclosure. Also, it should be understood that the figures are deliberately not drawn to scale and are exaggerated in some respects for clarity. Therefore, although a preferred embodiment of the roof shingle has been herein disclosed, it should be obvious that the disclosure is made by way of example only and that variations are possible without departing from the subject matter coming within the scope of the following claims, which claims are regarded as the invention.

What is claimed is:

1. A roofing shingle to be used in conjunction with other like shingles comprises:
   a) a body portion of substantially planar, rectangular configuration, relatively thin in thickness and having a top and bottom surface and upper, lower and opposite side edges, said body portion being formed of fibrous filler and plastic;
   b) the body portion being provided with a plurality of corrugations of irregular size in depth, width and length and randomly arranged between said opposite side edges to simulate the texture of natural material;
   c) each of the corrugations extend from the lower edge substantially parallel to the opposite side edges and terminating at points spaced from the upper edge so that the top and bottom surfaces have substantially flat surface areas extending between the opposite side edges and the upper edge portion and the points of termination of the corrugations;
   d) a channel in the flat area of the bottom surface and extending between the opposite side edges and substantially parallel to the upper edge to thereby form in the flat area of the top surface a continuous ridge portion for blocking the flow of water along the top surface of the roof shingle to the upper edge of the roof shingle;
   e) the corrugations next adjacent each of the opposite side edges are contoured and dimensioned so as to nest with the corrugation next adjacent each of the opposite side edges of the next adjacent alike roofing shingle;
   f) the shingle is so contoured and dimensioned as to have an up-turned lip portion adjacent the corrugation next adjacent said opposite side edge which nests within the corrugation of the next adjacent like roof shingle and the roof shingle being contoured and dimensioned to provide a corrugation with which the up-turned lip portion nests.

2. The roofing shingle according to claim 1, wherein granules of water-resistant and fire-proof material are embedded in said body portion.

3. A roofing shingle to be used in conjunction with other like shingles formed by the steps of:
   continuously feeding a ground fibrous filler and plastic material into an extruder wherein said fibrous filler and plastic material are mixed under pressure into a homogeneous mixture and discharged in the form of a continuously moving flat sheet;
   continuously depositing on the top surface of the continuously moving flat sheet granules of wear resistant and fire-proof material;
   conducting the flat sheet between two interfitting contour rollers to impress the granules and impart to the granules and to the flat sheet an irregular textured configuration and to form a first corrugation and second corrugation on side edges, the corrugations being dimensioned such that adjacent first and second corrugations nest one within the other, an upturned lip portion being formed adjacent said first corrugation and an upturned lip receiving portion being formed adjacent said second corrugation for defining a water dam when the first and second corrugations nest on within the other; and,
   subsequently continuously cutting the contoured sheet at predetermined intervals to provide roofing shingles of a selected size.

* * * * *